(12) United States Patent
Burling (10) Patent No.: US 11,390,341 B2
(45) Date of Patent: Jul. 19, 2022

(54) DEVICE TO ENHANCE THE TRACTION OF A TRACKED VEHICLE

(71) Applicant: JB INNOVATIONS LIMITED, New Plymouth (NZ)

(72) Inventor: John Menzies Burling, Eltham (NZ)

(73) Assignee: JB Innovations Limited, New Plymouth (NZ)

( * ) Notice: Subject to any disclaimer, the term of this patent is extended or adjusted under 35 U.S.C. 154(b) by 802 days.

(21) Appl. No.: 16/065,605

(22) PCT Filed: Dec. 23, 2016

(86) PCT No.: PCT/NZ2016/050210
§ 371 (c)(1),
(2) Date: Jun. 22, 2018

(87) PCT Pub. No.: WO2017/111624
PCT Pub. Date: Jun. 29, 2017

(65) Prior Publication Data
US 2021/0163087 A1   Jun. 3, 2021

(30) Foreign Application Priority Data
Dec. 24, 2015 (NZ) ........................................ 715612

(51) Int. Cl.
*B62D 55/28* (2006.01)
(52) U.S. Cl.
CPC .................. *B62D 55/286* (2013.01)
(58) Field of Classification Search
CPC ...... B62D 55/26; B62D 55/28; B62D 55/283; B62D 55/286
See application file for complete search history.

(56) References Cited

U.S. PATENT DOCUMENTS

| 1,832,926 A | 11/1931 | Edstedt |
| 3,717,387 A | 2/1973 | Cackley et al. |
| 4,043,610 A | 8/1977 | Halmosi et al. |

(Continued)

FOREIGN PATENT DOCUMENTS

| CA | 2137859 A1 | 6/1996 |
| DE | 20 2013 011 423 U1 | 3/2014 |

(Continued)

OTHER PUBLICATIONS

International Search Report cited in PCT/NZ2016/050210, dated Mar. 15, 2017. (3 pages).

*Primary Examiner* — Jason R Bellinger
(74) *Attorney, Agent, or Firm* — Workman Nydegger (57) ABSTRACT

A device for use with a continuous track of a tracked vehicle to enhance the traction of the vehicle. The device has an elongate body having a surface and a longitudinal axis. A bracket is arranged to secure the elongate body to the continuous track. A first ground engaging feature and a second ground engaging feature are operatively attached to the elongate body and project beyond the surface of the elongate body. The first ground engaging feature has a plurality of teeth arranged in a line and the second ground engaging feature has a plurality of teeth arranged in a line. The line of the first ground engaging feature extends at an angle relative to the longitudinal axis of the elongate body and at an angle relative to the line of the second ground engaging feature.

18 Claims, 12 Drawing Sheets

(56) References Cited

U.S. PATENT DOCUMENTS

| | | | |
|---|---|---|---|
| 5,713,645 A | 2/1998 | Thompson et al. | |
| 5,769,511 A | 6/1998 | Hattori | |
| RE36,025 E | 1/1999 | Suzuki | |
| 6,299,265 B1 | 10/2001 | Hoffart | |
| 6,540,310 B1 | 4/2003 | Cartwright | |
| 6,557,954 B1 | 5/2003 | Hattori | |
| 7,901,015 B1 * | 3/2011 | Anderson | B62D 55/28 305/51 |
| 9,260,145 B2 * | 2/2016 | Korus | B62D 55/244 |
| 9,862,436 B2 * | 1/2018 | Burling | B62D 55/286 |
| 9,950,757 B2 * | 4/2018 | Tibbits | B62D 55/286 |
| 2003/0184157 A1 | 10/2003 | McNutt et al. | |
| 2004/0140717 A1 | 7/2004 | McNutt et al. | |
| 2004/0174068 A1 | 9/2004 | McNutt et al. | |
| 2013/0049452 A1 | 2/2013 | Burling | |
| 2015/0175225 A1 | 6/2015 | Hall | |
| 2018/0319450 A1 * | 11/2018 | Wilson | B62D 55/286 |

FOREIGN PATENT DOCUMENTS

| | | | |
|---|---|---|---|
| EP | 3552931 A1 * | 10/2019 | B62D 55/283 |
| FR | 2 114 564 | 6/1972 | |
| JP | 2001-253375 | 9/2001 | |
| JP | 2004-058688 | 2/2004 | |
| NZ | 511373 | 11/2002 | |
| WO | WO-9104186 A1 * | 4/1991 | B62D 55/286 |
| WO | 2011/096829 | 8/2011 | |

* cited by examiner

FIGURE 17 ing statements in this specification which include 'compris-
DEVICE TO ENHANCE THE TRACTION OF A TRACKED VEHICLE

CROSS-REFERENCE TO RELATED APPLICATIONS

This application is a US nationalization of PCT Application No. PCT/NZ2016/050210, filed Dec. 23, 2016, which claims priority to New Zealand Application No. 715612, filed Dec. 24, 2015, which are incorporated herein by specific reference.

FIELD OF THE INVENTION

This invention relates to a device for use with a continuous track of a tracked vehicle to enhance the traction of the vehicle.

BACKGROUND

Continuous tracks are often used on off-road vehicles to provide ground contact and traction for large vehicles. Standard continuous tracks are formed from a number of rigid track shoes that are joined to each other by hinges. Each track shoe typically has one or more ribs extending along the shoe to provide traction. Standard continuous tracks provide traction in general situations. However, those standard tracks do not provide adequate traction on steeps slopes, or slopes that are slippery from mud, water or ice. In particular, those standard tracks do not provide adequate traction on steep or slippery slopes for larger, heavier vehicles.

Typically, to increase the traction of a tracked vehicle, additional traction devices are welded to the track. However, those traction devices can only be removed by being cut free, which can damage the track and/or the device. Welding the traction devices to the track and cutting the devices free from the track can be difficult and time consuming.

There are a number of devices for use with the continuous track of a tracked vehicle. Examples of such devices are described in U.S. Re 36,025 that describes a detachable elastic pad to protect a road surface from damage caused by a tracked vehicle; JP 2001253375 that describes a padded shoe for a track belt; and NZ 511373 that describes an elastic pad for a crawler track shoe. The pads described in those documents are designed to reduce damage to the ground and would not provide good stability to a vehicle on a steep or slippery slope.

U.S. Pat. No. 6,540,310 describes a grouser structure that provides traction and shock absorption and JP 2004058688 describes a detachable grouser for a track. Both those documents describe using fasteners that extend through the track, which can be awkward to assemble if the track is already installed on a vehicle.

US 2004/0174068, US 2003/0184157, and US 2004/0140717 each describes a detachable grouser assembly for use with vehicles having continuous tracks. Those documents describe attaching the grousers with fasteners that extend through the track shoe or with chains that extend over the track shoe. As described above, attaching a grouser assembly with fasteners can be awkward if the track is already installed on a vehicle. Attaching a grouser assembly using a chain is not very secure and the assembly could be ripped off when the vehicle is used.

U.S. Pat. No. 6,299,265 describes a replaceable tyre gripping system for an endless track to extend the life of a track. The system described in this document would not enhance the traction of a tracked vehicle.

The applicant's earlier PCT application WO/2011/096829 describes a device to enhance the traction of a tracked vehicle.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide a device to enhance the traction of a vehicle having a continuous track, and/or to at least provide the public with a useful choice.

SUMMARY OF THE INVENTION

In accordance with a first aspect of the invention, there is provided a device for use with a continuous track of a tracked vehicle to enhance the traction of the vehicle, the device comprising:

an elongate body having a surface and a longitudinal axis;

a bracket arranged to secure the elongate body to the continuous track; and a first ground engaging feature and a second ground engaging feature operatively attached to the elongate body and projecting beyond the surface of the elongate body;

the first ground engaging feature having a plurality of teeth arranged in a line, the second ground engaging feature having a plurality of teeth arranged in a line, the line of the first ground engaging feature extending at an angle relative to the longitudinal axis of the elongate body and at an angle relative to the line of the second ground engaging feature.

The term 'comprising' as used in this specification means 'consisting at least in part of'; that is to say when interpreting statements in this specification which include 'comprising', the features prefaced by this term in each statement all need to be present but other features can also be present. Related terms such as 'comprise' and 'comprised' are to be interpreted in a similar manner.

In one embodiment, the first ground engaging feature is spaced at a distance from the second ground engaging feature to provide a clearance space.

In one embodiment, each of the teeth has a generally chevron or inverted V-shaped ground engaging surface.

In one embodiment, the elongate body has a generally flat and planar ground engaging surface.

In one embodiment, the device is releasably securable to the continuous track.

In one embodiment, the device comprises a releasable bracket for releasably securing the elongate body to the continuous track.

In one embodiment, the releasable bracket comprises a bracket body, a first clamping member extending from the bracket body, a second clamping member extending from the bracket body at an acute angle relative to the first clamping member, and a fastener, wherein the bracket is arranged such that fastening the fastener causes the bracket body to wedge the elongate body and a track shoe of the continuous track between the first clamping member and the second clamping member.

In one embodiment, the device further comprises a further bracket for releasably securing the elongate body to the other side edge of the continuous track, the further bracket comprising a bracket body.

In one embodiment, the further bracket is a fixed bracket that is permanently fixed to the elongate body. The fixed bracket may be integrally formed with the elongate body. Alternatively, the fixed bracket may be formed as a separate component and fixed to the elongate body by fasteners, for example.

The elongate body may be substantially rigid.

In one embodiment, the further bracket is a releasable bracket that is releasably secured to the elongate body.

In one embodiment, the bracket(s) is/are positioned at the end(s) of the elongate body.

In accordance with a second aspect of the invention, there is provided combination of a track shoe and at least one device of the first aspect secured to the track shoe.

In one embodiment, the track shoe comprises side ribs with a gap between the side ribs, and the elongate body of the device substantially fills the gap between the side ribs and contact the side ribs.

In one embodiment, the track shoe further comprises an intermediate rib positioned between the two side ribs, and the elongate body nests between two side ribs of the track shoe and extends over the intermediate rib.

In one embodiment, the elongate body extends across the transverse length of the track shoe, from one end of the track shoe to the other end of the track shoe.

In one embodiment, the device is releasably secured to the continuous track.

The second aspect may include any one or more features of the first aspect above.

In accordance with a third aspect of the invention, there is provided combination of a continuous track with at least one device of the first aspect secured to the track.

The third aspect may include any one or more features of the first aspect or second aspect above.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings in which.

DETAILED DESCRIPTION OF EMBODIMENTS OF THE INVENTION

Figure 1:
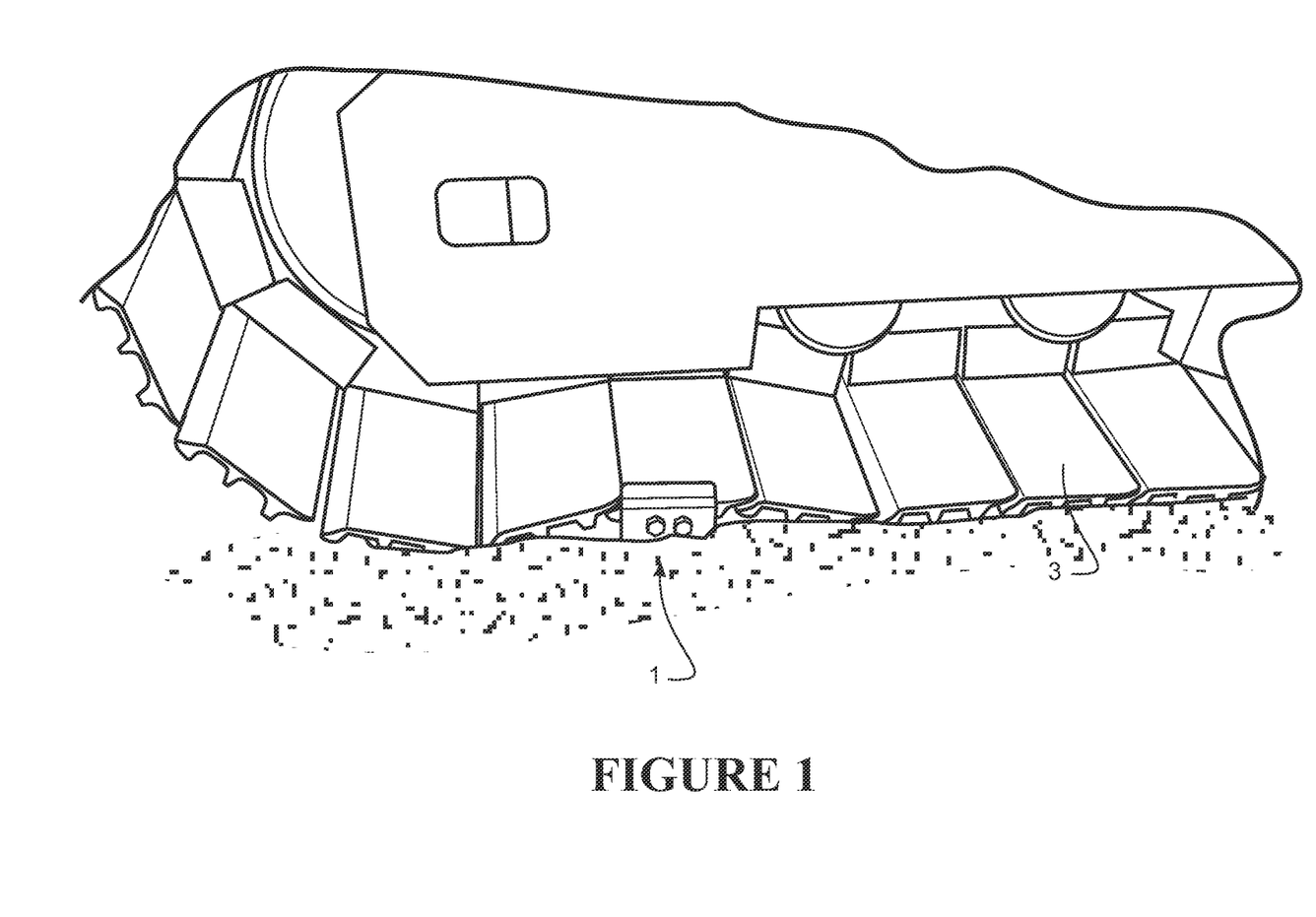
FIG. 1 is a perspective view of an embodiment of the device secured to a continuous track of a vehicle.
Figure 2:
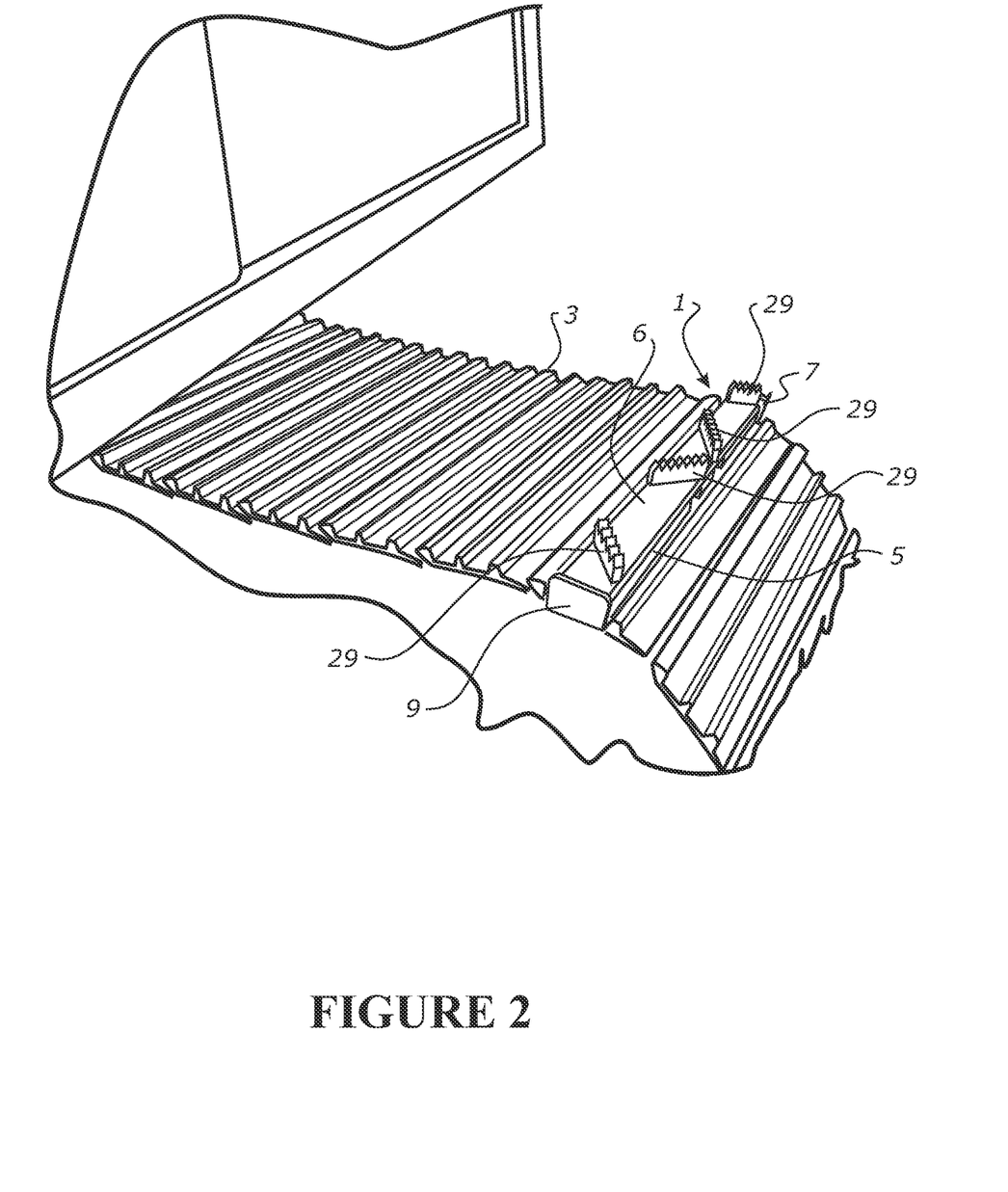
FIG. 2 is another perspective view of the device of FIG. 1 secured to a continuous track of a vehicle.

With reference to FIGS. 1 and 2, an embodiment of the device 1 for use with a continuous track 3 of a vehicle is shown. The device may be used on any tracked vehicle to enhance traction in snowy or icy conditions, such as a digger, bulldozer, snowmobile, crawler, or tank, for example.

Unless otherwise specified, it should be appreciated that references to directions in the following description such as top, upper, lower, inverted or leading are for reference only, and should not be considered limiting.

The device 1 comprises a rigid elongate body 5 having a ground contacting surface 6 and a pair of brackets for releasably securing the elongate body 5 to the continuous track 3.

In the embodiment shown, the pair of brackets comprises a releasable bracket 7 and a fixed bracket 9. The brackets 7, 9 are rigid brackets.

Figure 6:
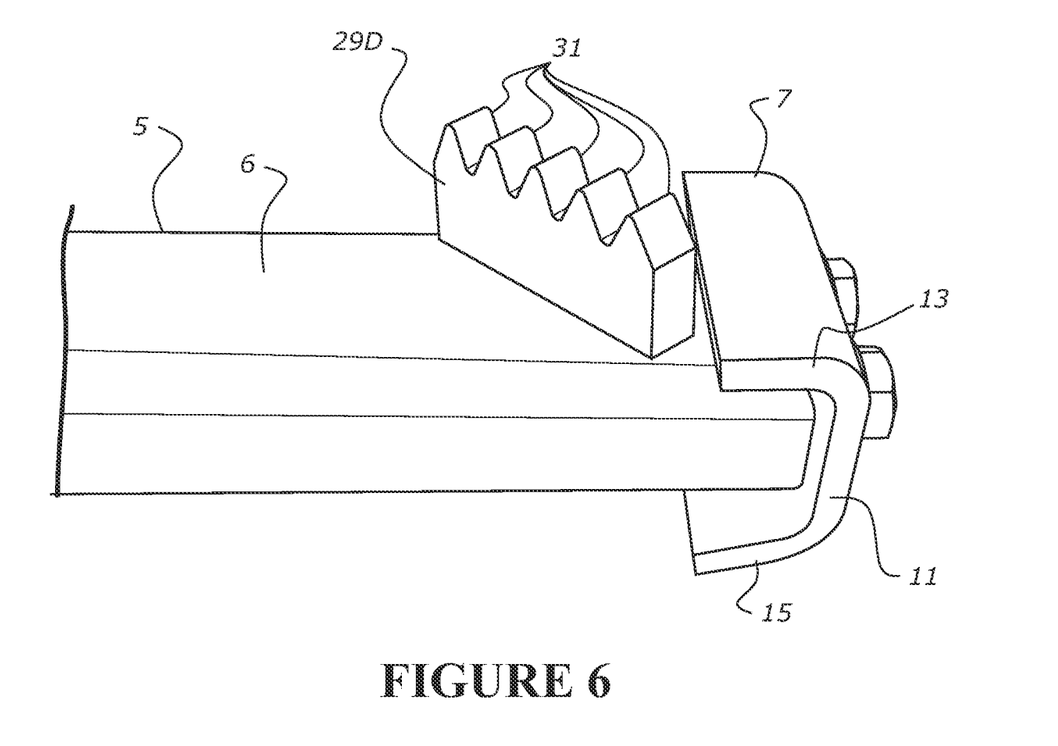
FIG. 6 is a partial perspective view showing the releasable bracket of the device of FIG. 2.
Figure 7:
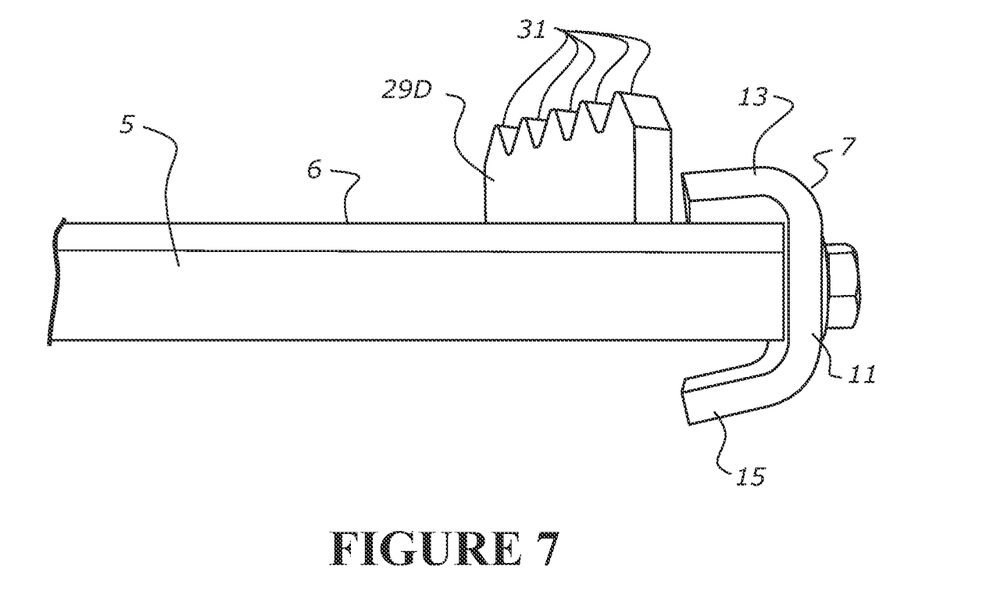
FIG. 7 is a partial side view showing the releasable bracket of the device of FIG. 2.
Figure 8:
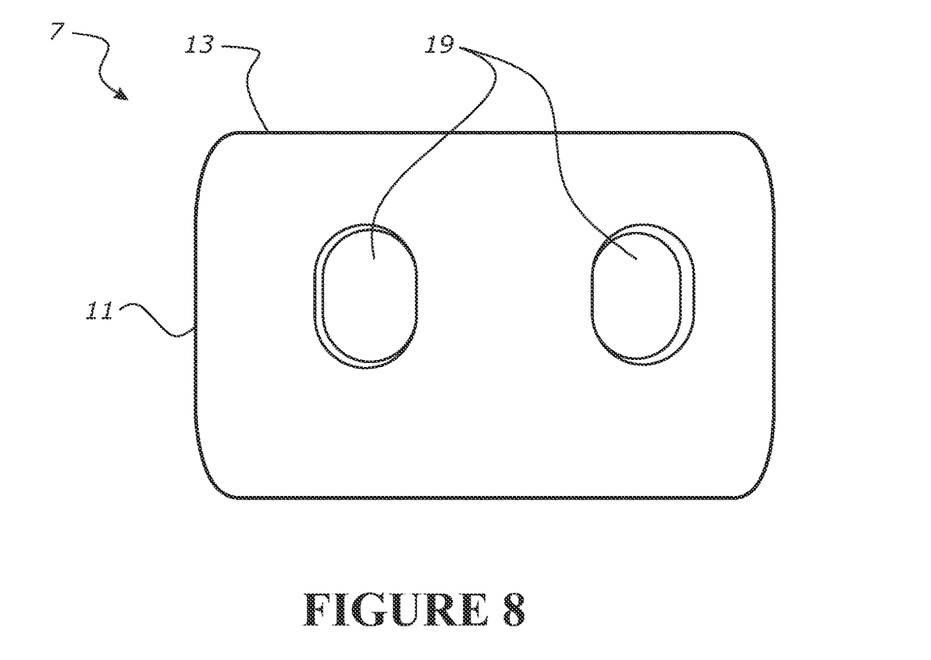
FIG. 8 shows the bracket body of the releasable bracket of the device of FIG. 2.

The releasable bracket 7 has a bracket body 11 and first clamping members, in the form of a flange 13. In the embodiment shown, the flange 13 is integrally formed with the bracket body. The flange 13 extends generally perpendicularly from the bracket body 11. The releasable bracket 7 has a second clamping member in the form of a bracket leg 15. The bracket leg 15 extends downwardly at an angle from the bracket body 11 and at a non-parallel angle relative to the flange 13. The angle is any suitable angle. In the embodiment shown, the angle is about 30°. The flange 13 also protects the fastener(s) from the cold temperatures caused by snow and ice.

The releasable bracket 7 has at least one fastener 17 extending through the bracket body 11 into the elongate body 5. In the embodiment shown, the releasable bracket 7 has a pair of fasteners 17. The fasteners 17 extend through clearance slots 19 in the bracket body 11 and engage with corresponding threaded holes (not visible) formed in the elongate body 5. The fasteners 17 are positioned in the lower part of the bracket body so that the clamping force provided by the fasteners 17 is close to the track shoe.

Figure 9:
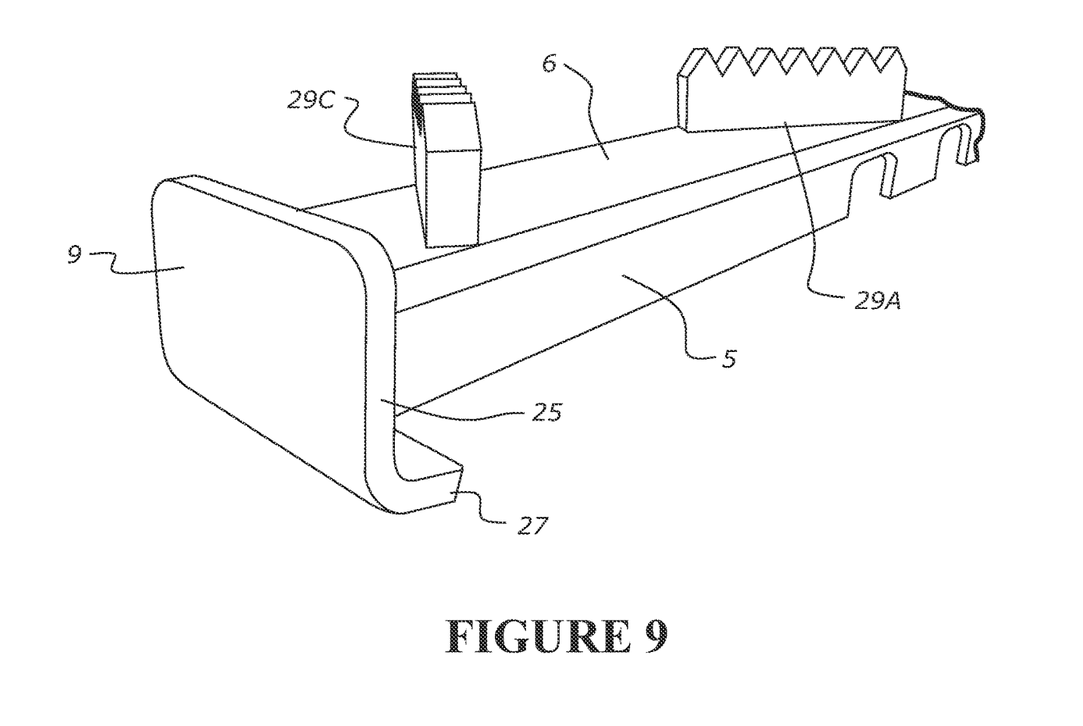
FIG. 9 is a partial perspective view showing the fixed bracket of the device of FIG. 2
Figure 10:
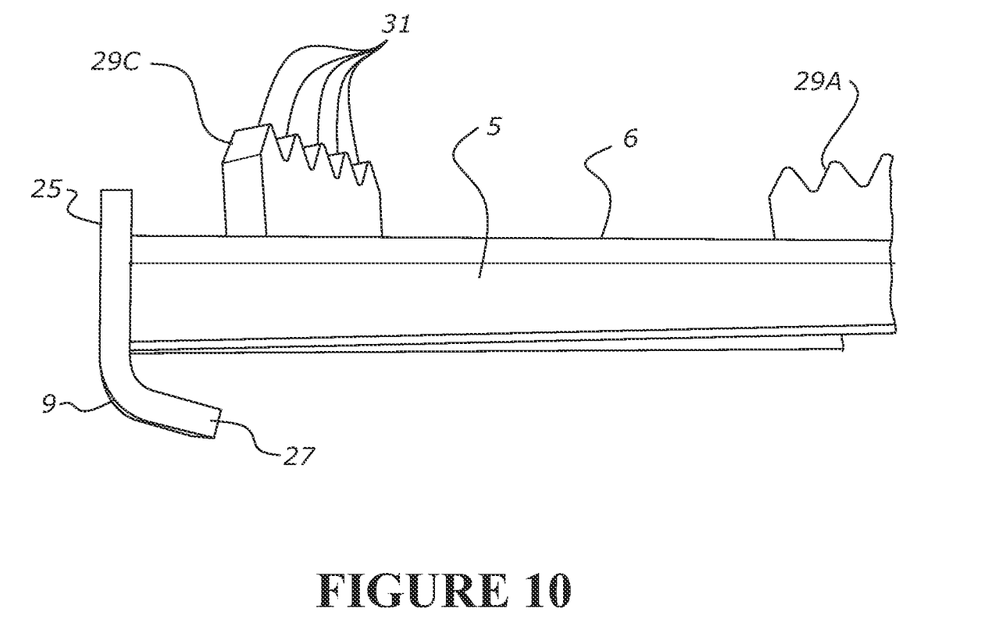
FIG. 10 is a partial side view showing the fixed bracket of the device of FIG. 2.
Figure 11:
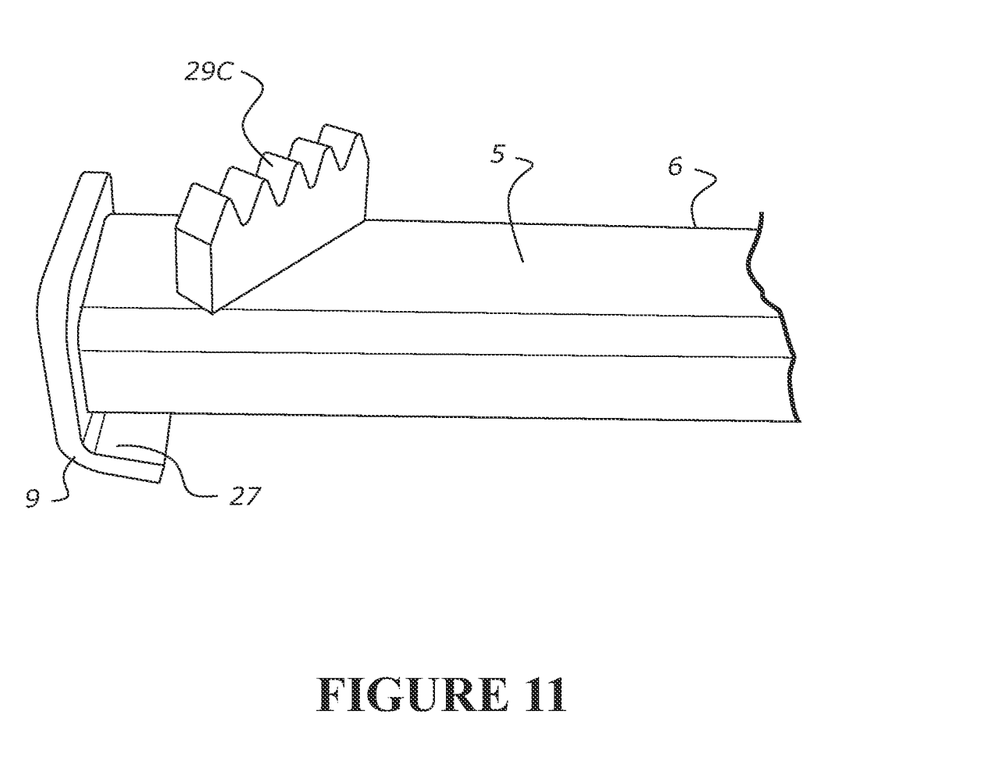
FIG. 11 is a partial perspective view showing the fixed bracket.

The fixed bracket 9 is similar to the releasable bracket 7, except that it is permanently fixed to the elongate body 5. The fixed bracket has a bracket body 25 and a bracket leg 27 extending downwardly at an angle from the bracket body 25.

The elongate body 5 has a generally flat and planar top surface and the ground contacting surface 6 is a generally flat top surface. This is useful in snowy or icy conditions because the flat profile prevents snow or ice from building up on the ground contacting surface 6. In the embodiment shown, the cross-sectional profile of the ground contacting surface 6 is generally constant along the length of the elongate body 5.

The ground engaging features 29 have a plurality of teeth, sharp points or serrations 31. The ground engaging features 29 are operatively attached to the elongate body 5. In the embodiment shown, the ground engaging features 29 are attached directly to the elongate body 5 by welding. The ground engaging features may be attached by single or double welding. Alternatively, the ground engaging features 29 may be connected to the elongate body 5 via spacers or other components.

The device has a first ground engaging feature 29A and second ground engaging feature 29B operatively attached to the elongate body and projecting beyond the surface of the elongate body.

Figure 4:
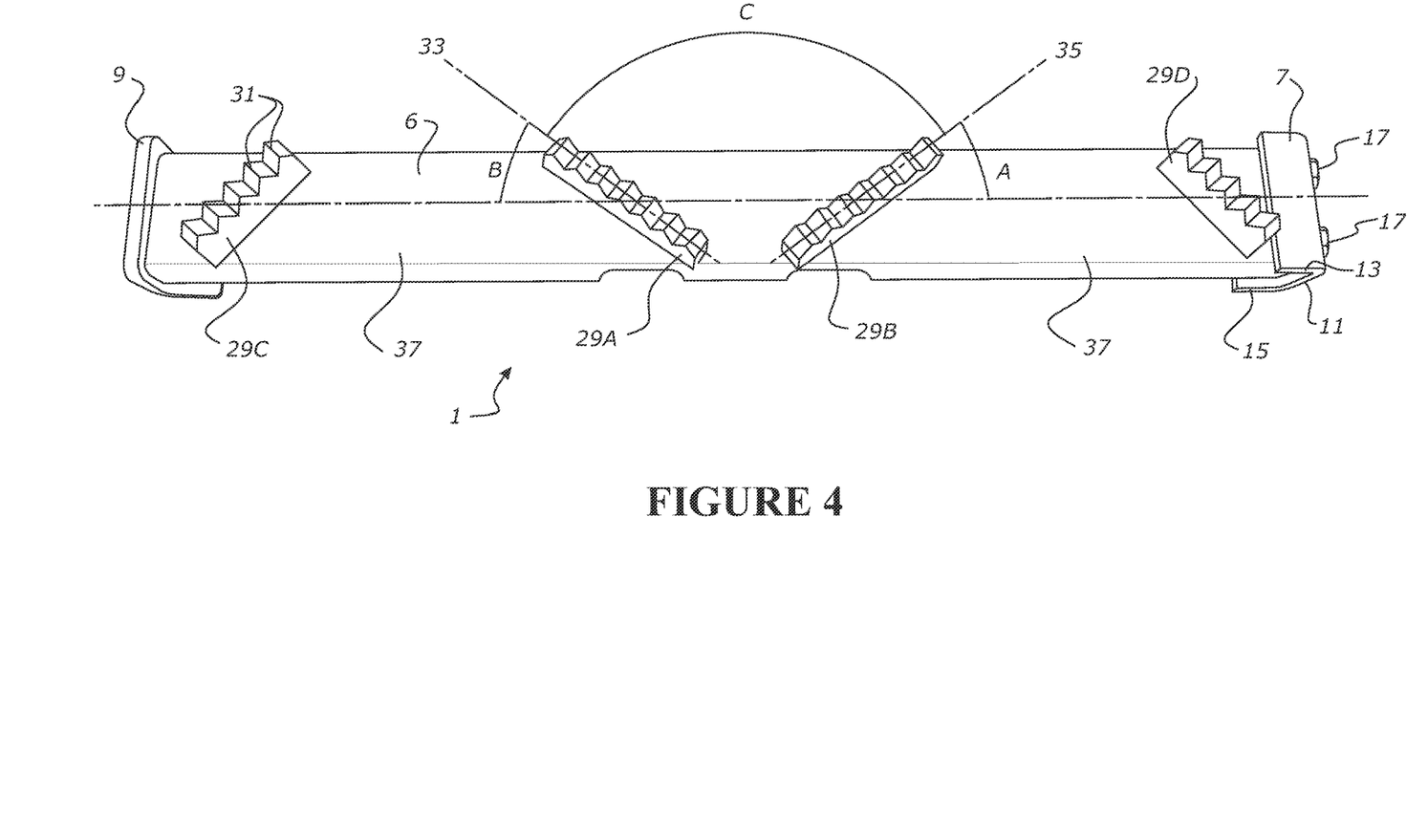
FIG. 4 is a top view of the device of FIG. 2.
Figure 5:
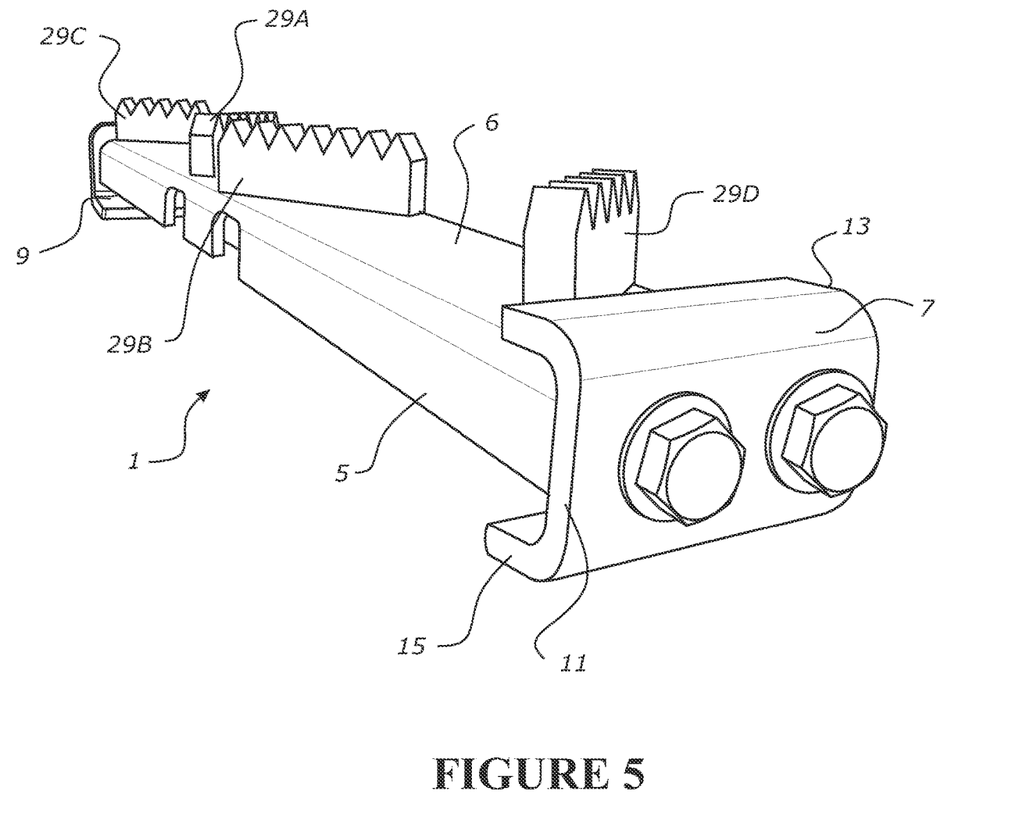
FIG. 5 is a perspective view from the end of the device of FIG. 2.

With reference to FIG. 4, first ground engaging feature 29A has a plurality of teeth 31 arranged in a line 33 and the second ground engaging feature 29B has a plurality of teeth 31 arranged in a line 35. The line 33 of the first ground engaging feature 29A extends at an angle B relative to the longitudinal axis of the elongate body and at an angle C relative to the line 35 of the second ground engaging feature 296. By having ground engaging features that extend at an angle, those features suitably enhance traction of the vehicle in the running direction of the track and enhance traction of the vehicle in a direction transverse to the running direction of the track. The angle features also prevent the device 1 from rocking.

In the embodiment shown, the angle C between the lines of teeth is about 120 degrees. The angle B between the line of teeth of the first ground engaging feature and the longitudinal axis of the device is about 30 degrees. The angle A between the line of teeth of the second ground engaging feature and the longitudinal axis of the device is about 30 degrees. The line of teeth may extend at other angles, such as about 20 degrees, 40 degrees, 45 degrees, 50 degrees, or 60 degrees, for example. Angle A may be the same as angle B, or they may be different. In another alternative embodiment, the lines may not be straight lines.

Each ground engaging feature 29 is a plate-like component with the teeth 31 having a constant profile from one side of the plate to the other side of the plate. In an alternative embodiment, the profile may vary from one side of the tooth to the other side of the tooth. The teeth 31 are connected together to form a saw tooth-like part. Alternatively, the teeth 31 may be separate parts. The teeth 31 may be integrally formed with the elongate body 5 or formed as separate components that are welded to the elongate body.

Each of the teeth has a generally chevron or inverted V-shaped ground engaging surface. That shape allows the teeth to bite into ice or snow and provide grip to the tracked vehicle.

The first ground engaging feature 29A is spaced at a distance from the second ground engaging feature 29B to provide a clearance space 37. When the device 1 is used on a track of a tracked vehicle in snow or ice, the clearance space 37 allows the snow or ice to move free from between the ground engaging features. That is, the device 1 is self-cleaning of ice and snow that may otherwise become stuck on the device.

The embodiment shown has third 29C and fourth 29D ground engaging features. The features and operation are similar to the first and second ground engaging features. The third and fourth ground engaging features are spaced from the first and second ground engaging features to provide additional clearance spaces 37.

The elongate body 5 and the brackets 7, 9 may be formed from a suitable metallic material, such as mild steel or medium tensile steel. In the form shown, the elongate body 5 is formed from a single length of steel. The elongate body 5 also could be made out of two pieces of sheet or plate material, which are then bent into shape and welded along the top to form a shape generally as shown. The teeth may be formed from high tensile steel. A suitable high tensile steel may have a Rockwell C hardness of about 40 to about 50.

The brackets 7, 9 may be formed from steel plate and bent into the required shape. Alternatively, the brackets 7,9 may be cast into the required shape. The flange 13 of the releasable bracket 7 may be formed by welding bolts or rods to the bracket body.

The fixed bracket 9 may be welded to the elongate body 5. Alternatively, the fixed bracket 9 may be formed as a separate component that is fixed to the elongate body 5, for example, by fasteners. In another alternative, the elongate body 5 and fixed bracket may 9 be formed as a single integral component.

To assemble the device to the track, the elongate body 5 is placed on the track. The elongate body 5 is adapted to nest between ribs of a rigid track shoe of the continuous track. The elongate body 5 nests between two side ribs of the track shoe and extends the transverse length of the shoe, between the side edges 3b of the track. In the embodiment shown, the elongate body 5 has a clearance slot 35 allowing the elongate body 5 to extend over the central rib. The elongate body 5 has further clearance slots allowing the elongate body 5 to sit over track fasteners.

When assembled with the track shoe 3, the elongate body 5 substantially fills the gap between the side ribs and contacts the side ribs. Alternatively, the elongate body 5 may nest between two adjacent side ribs. The elongate body extends across the transverse length of the track shoe, from one end of the track shoe to the other end of the track shoe.

Figure 3:
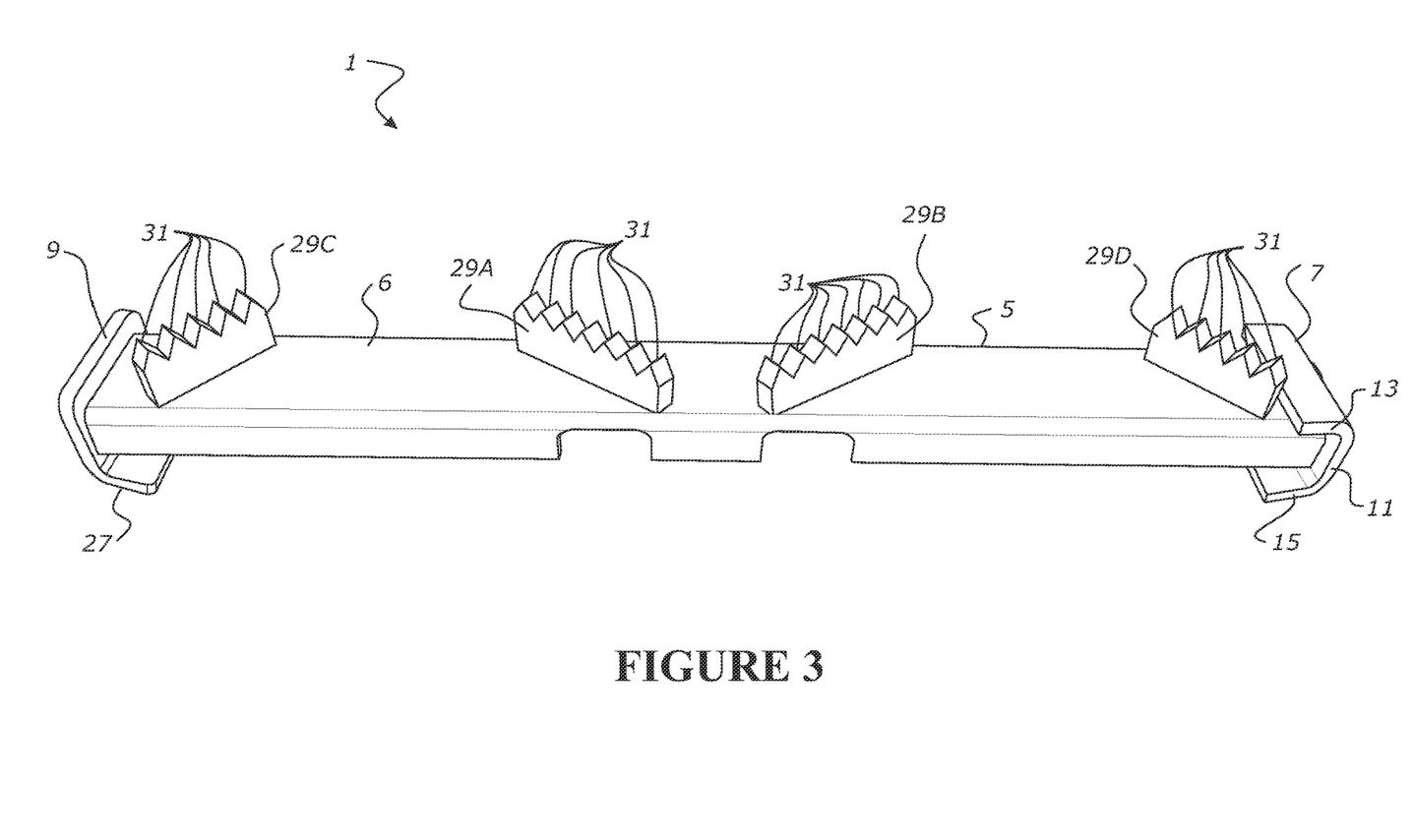
FIG. 3 is a perspective view of the device of FIG. 2.

The elongate body is placed on the track with the leg 27 of the fixed bracket positioned below the underside of the track. The releasable bracket may be loosely attached to the elongate body 5 before assembly to the track to decrease the time required to attach the device to the track, as shown in FIG. 3. Alternatively, the releasable bracket may not be attached to the elongate body 5 before the device is placed on the track, as shown in FIG. 2.

When the fasteners 17 are tightened, the bracket body 11 and elongate body 5 are drawn together in a generally horizontal direction. Fastening the fastener causes the leg 15 to engage with the underside of the track shoe and draw the flange 13 towards the elongate body to releasably secure the elongate body to the continuous track. As the bracket body 11 and elongate body 5 are drawn together, the end of the elongate body and the end of the track shoe are wedged between the flange 13 and the leg 15 to secure the elongate body 5 to the track 3. When secured, the flange contacts the top surface of the elongate body 5 and the leg contacts the underside surface of the track shoe. The secured bracket is shown in FIG. 2.

The clearance slots 19 formed in the bracket body allow the bracket to move relative to the elongate body 5 in the generally vertical direction as the fastener is tightened.

Tightening the releasable bracket to the track will simultaneously cause the fixed bracket and the other end of the elongate body 5 to be drawn towards the corresponding edge of the track. That movement releasably secures the other end of the elongate body 5 to the track. Due to the angle of the leg 27 that engages with the underside of the track shoe, that movement also pulls that end of the elongate body 5 down into secure engagement with the track shoe.

Over time, track shoes can become worn and the thickness of the track shoe can decrease. The relative angle between the leg 15 and the flange 13 allows the device to be used on continuous tracks having different track shoe thicknesses because the distance between the flange 13 and the bracket leg 15 can be adjusted to suit thinner tracks by tightening the fasteners 17.

In use, more than one device 1 would be used on the continuous track. For example, a continuous track may have about five or six devices along the track, spaced about one metre apart. The number of devices used on a track can be chosen depending on the traction required for any particular situation.

The device 1 may also be useful in situations where the vehicle is stuck, such as in very muddy situations. One end of a chain can be attached to the device 1 and the other end can be secured. The vehicle can then be driven forward by the vehicle pulling on the chain.

The device 1 can be removed by loosening the fastener 17, which will release the releasable bracket 7 and the fixed bracket 9 from the track. The elongate body 5 can then be removed from the track.

With reference to FIGS. 12 to 17, a second preferred embodiment of the device is shown. The features and operation of the second embodiment device are the same as the first embodiment described above, except as described below. Like numbers are used to indicate like parts with the addition of 100.

Figure 12:
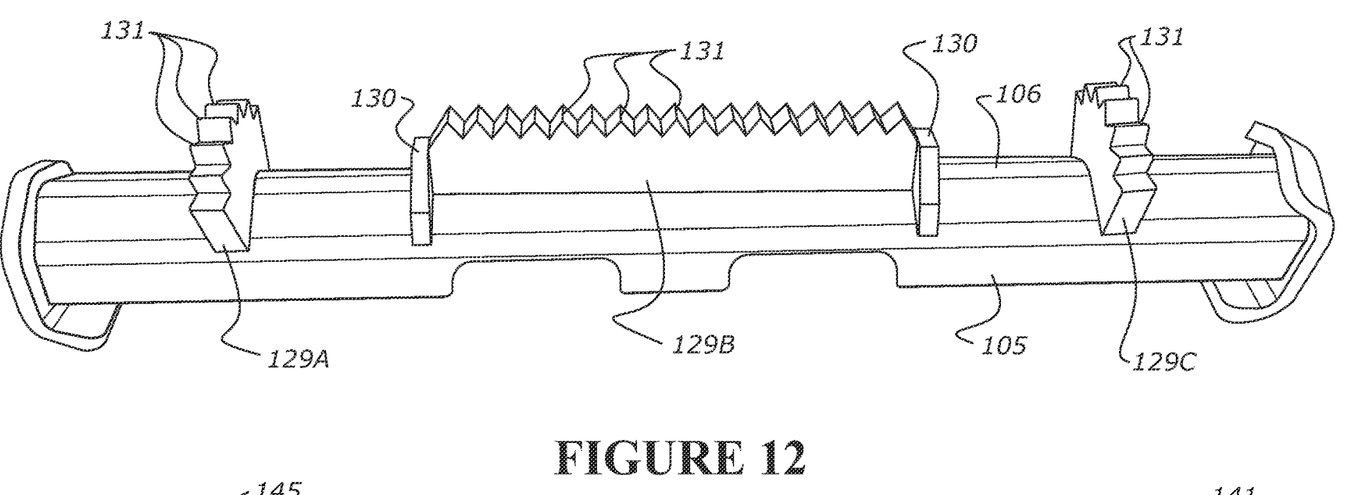
FIG. 12 is a perspective view of a second embodiment of the device.
Figure 13:
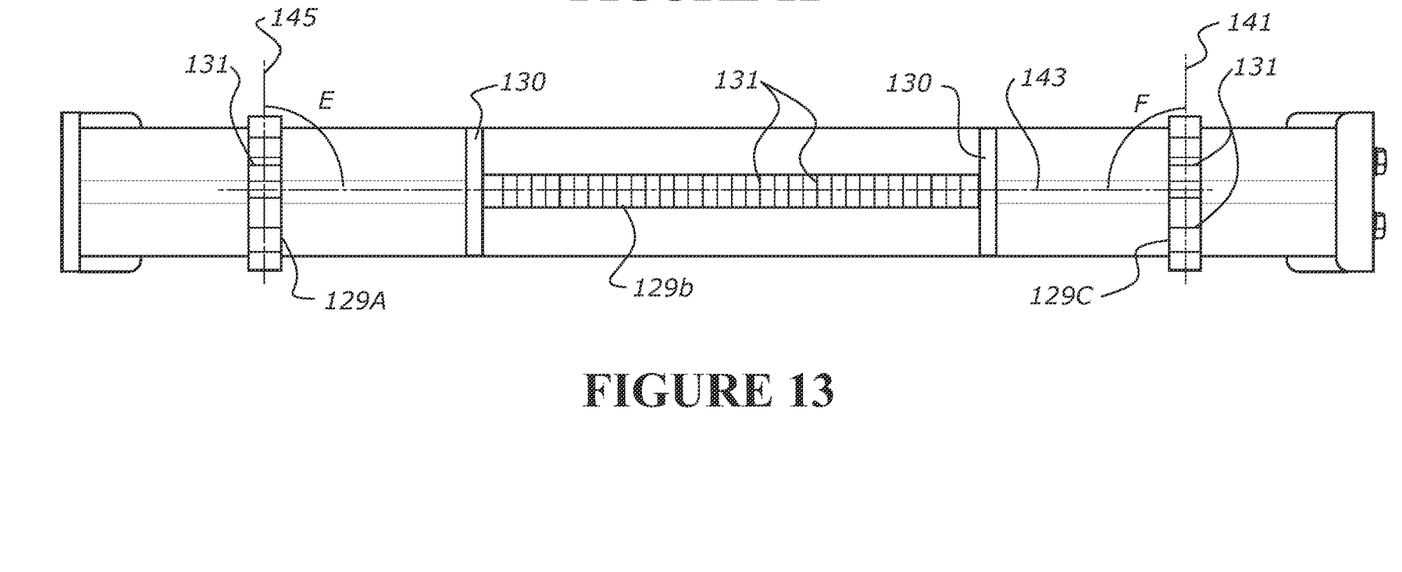
FIG. 13 is a top view of the device of FIG. 12.
Figure 14:
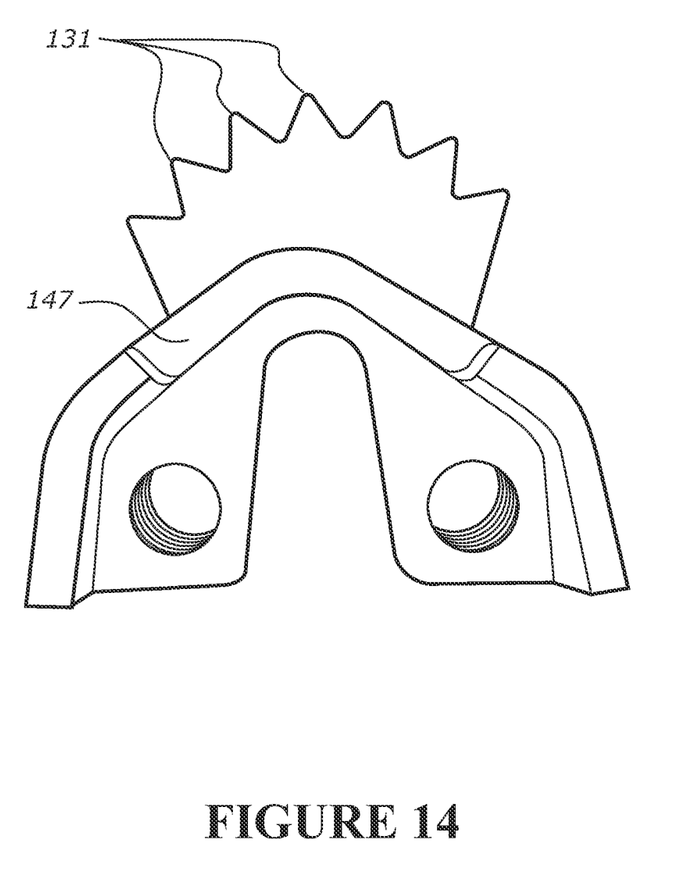
FIG. 14 is an end view of the elongate body of the device of FIG. 12.

The device has a first ground engaging feature 129A, second ground engaging feature 129B, and a third ground engaging feature 129C operatively attached to the elongate body 105. The ground engaging features 129A, 129B, 129C project beyond the surface 106 of the elongate body 105.

With reference to FIGS. 12 and 13, the first ground engaging feature 129A has a plurality of teeth 131 arranged in a line 145 and the second ground engaging feature 129B has a plurality of teeth 131 arranged in a line 143, when viewed from above. The line 145 of the first ground engaging feature 129A extends at an angle E relative to the longitudinal axis of the elongate body. Because the second ground engaging feature is parallel with the longitudinal axis, the line of the first ground engaging feature also extends at an angle relative to the line of the second ground engaging feature 129B. The line 141 of the third ground engaging feature 129C extends at an angle F relative to the longitudinal axis of the elongate body and at an angle (the same angle) relative to the line of the second ground engaging feature 129B. In the embodiment shown, the angles are the same because the second ground engaging feature 129B extends in a direction parallel to the direction of the elongate axis of the device. The second ground engaging feature 129B suitably enhances traction of the vehicle in the running direction of the track and the first and third ground engaging features 129A, 129C enhance traction of the vehicle in a direction transverse to the running direction of the track, for example a direction that is perpendicular to the running direction of the track.

The second ground engaging feature is supported at each end by a flange 130. The first and third ground engaging features 129A, 129C are shaped with the end points of the teeth 131 following a curved line.

In the embodiment shown, the angle E between the line of teeth of the first ground engaging feature 129A and the longitudinal axis of the device is about 90 degrees. The angle F between the line of teeth of the third ground engaging feature and the longitudinal axis of the device is about 90 degrees. The line of teeth may extend at other angles, such as about 80 degrees, 70 degrees, 60 degrees, 50 degrees, 40 degrees, 30 degrees, or 20 degrees for example. Angle A may be the same as angle B, or they may be different. In another alternative embodiment, the line may not be a straight line. In another alternative embodiment, the second ground engaging feature may extend at an angle relative to the elongate direction of the device, for example, five or ten degrees.

Figure 15:
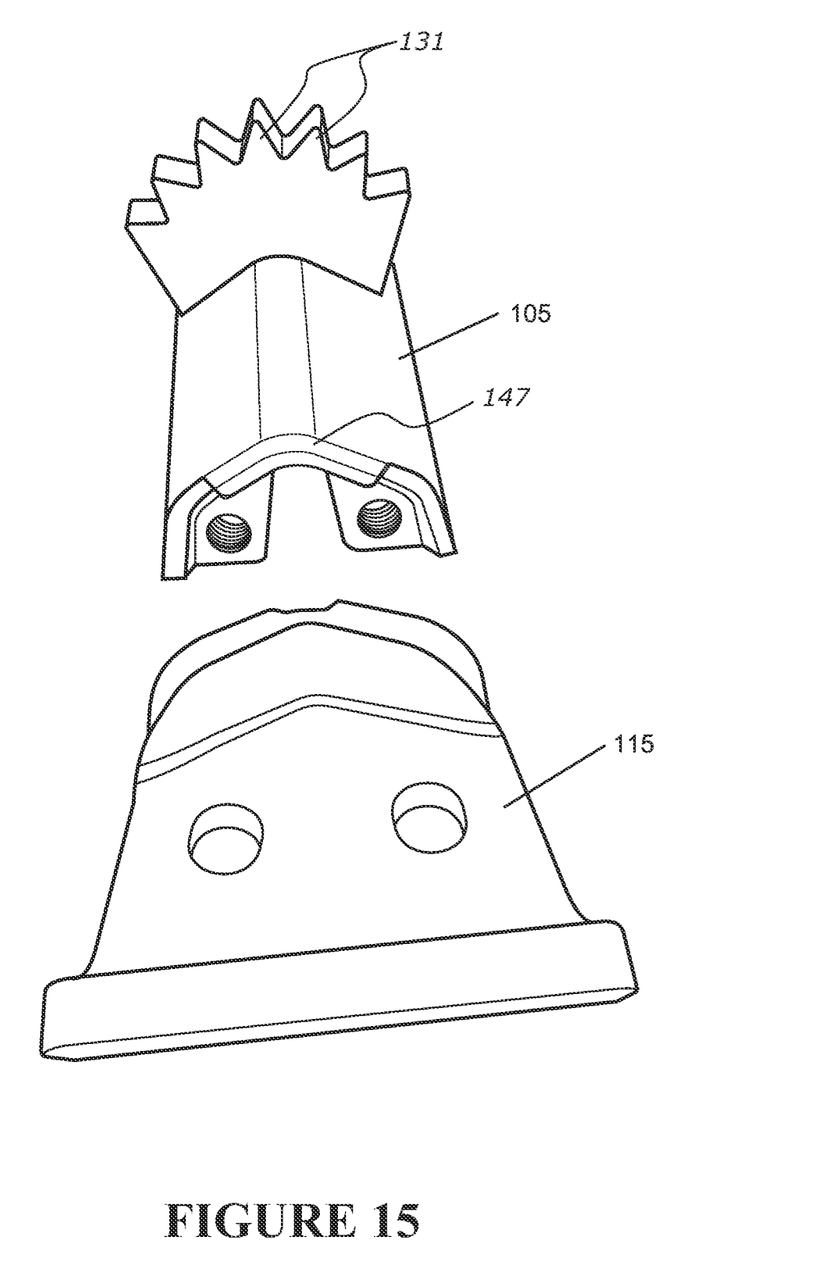
FIG. 15 shows the bracket and part of the elongate body of the device of FIG. 12.
Figure 16:
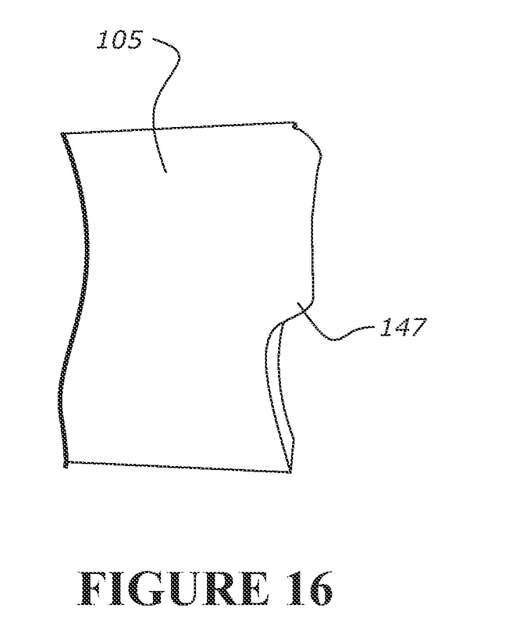
FIG. 16 is a partial view of the elongate body of the device of FIG. 12.
Figure 17:
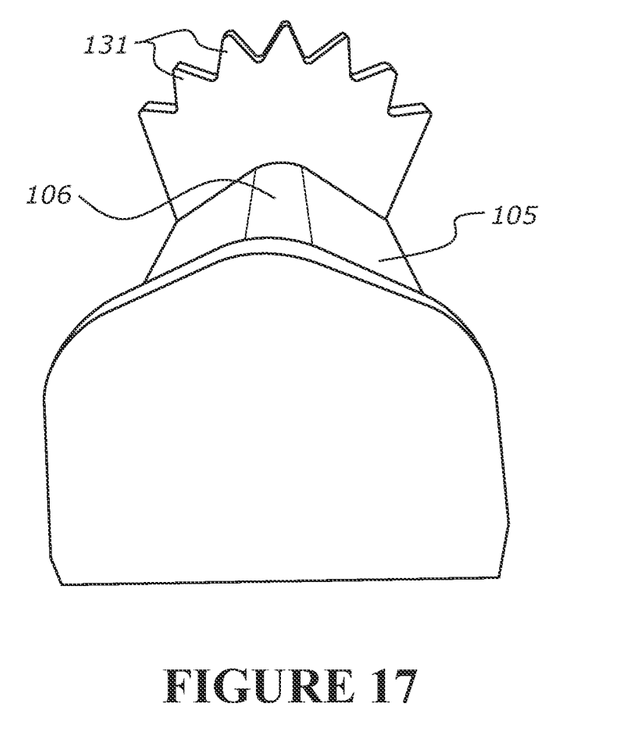
FIG. 17 is a perspective end view of the elongate body of the device of FIG. 12.

FIG. 15 shows the cross-section of the elongate body 105 is generally V-shaped (inverted). In particular, the elongate body 105 has a central section having two diverging portions and side walls that extend at a steeper angle than the central diverging portions. The central diverging portions are joined by a curved section. FIG. 15 also shows one embodiment of a bracket 115 that can be mounted at an end of elongate body 105. In addition, FIGS. 15 and 16 show that the elongate body 105 has bent end 147.

Embodiments of the invention have been described by way of example only and modifications may be made thereto without departing from the scope of the invention.

For example, in one alternative embodiment, the bracket leg may extend generally perpendicularly from the bracket body and the flange may extend at a non-perpendicular angle relative to the bracket body. In another alternative embodiment, the bracket leg and flange may extend at non-perpendicular angles relative to the bracket body.

In the embodiment shown, the first clamping member is defined by a single flange. Alternatively, the first clamping member may be formed by any other suitable protrusion(s), such as ribs, plates, bosses or shoulders, for example. There may be one, two, or more protrusions that form the first clamping member.

The ground-contacting surface may be formed with a textured surface and/or outwardly extending features to further enhance the traction of the device and the continuous track.

It will be appreciated that the device may a multi-fit device that may be used for different tracked vehicles. Such a multi-fit device may be narrower, for example, to fit the various different types of tracks, or have features that allow the device to be positioned on or adjacent a grouser of a track shoe.

In an alternative embodiment, the ground engaging features may not have serrations or teeth. That alternative embodiment is useful for quarry situations, for example, if a vehicle is stuck in the quarry.

Other alternatives to the embodiments described are set out in the 'Summary of the Invention' section.

What I claim is:

1. A device for use with a continuous track of a tracked vehicle to enhance the traction of the vehicle, the device comprising:

an elongate body having a surface and a longitudinal axis that longitudinally extends along a length of the elongate body;

a bracket arranged to secure the elongate body to the continuous track; and a first ground engaging feature and a second ground engaging feature operatively attached to the elongate body and outwardly projecting beyond the surface of the elongate body;

the first ground engaging feature having a plurality of teeth arranged in a line, the second ground engaging feature having a plurality of teeth arranged in a line that extends in a direction parallel to the direction of the longitudinal axis of the elongate body, the line of the first ground engaging feature extending at an angle relative to the longitudinal axis of the elongate body and at an angle relative to the line of the second ground engaging feature, wherein the first ground engaging feature is longitudinally spaced apart from the second ground engaging feature along the length of the elongate body so that a clearance space is formed between the first ground engaging feature and the second ground engaging feature, and wherein each of the plurality of teeth of the first ground engaging feature and the second ground engaging feature terminate at a sharpened end point.

2. The device as claimed in claim 1, wherein each of the plurality of teeth of the first ground engaging feature and the second ground engaging feature has a generally chevron or inverted V-shaped ground engaging surface.

3. The device as claimed in claim 1, wherein the elongate body has a generally planar ground engaging surface.

4. The device as claimed in claim 1, wherein the device is releasably securable to the continuous track.

5. The device as claimed in claim 1, wherein the device comprises a releasable bracket for releasably securing the elongate body to the continuous track.

6. The device as claimed in claim 5, wherein the releasable bracket comprises a bracket body, a first clamping member extending from the bracket body, a second clamping member extending from the bracket body at an acute angle relative to the first clamping member, and a fastener, wherein the bracket is arranged such that fastening the fastener causes the bracket body to wedge the elongate body and a track shoe of the continuous track between the first clamping member and the second clamping member.

7. The device as claimed in claim 1, wherein the device further comprises a further bracket for releasably securing the elongate body to the other side edge of the continuous track, the further bracket comprising a bracket body.

8. The device as claimed in claim 7, wherein the further bracket is a fixed bracket that is permanently fixed to the elongate body.

9. The device as claimed in claim 1, wherein the bracket(s) is/are positioned at the end(s) of the elongate body.

10. A combination of a track shoe and at least one device as claimed in claim 1 secured to the track shoe.

11. The combination as claimed in claim 10, wherein the track shoe comprises side ribs with a gap between the side ribs, and the elongate body of the device substantially fills the gap between the side ribs and contacts the side ribs.

12. The combination as claimed in claim 11, wherein the track shoe further comprises an intermediate rib positioned between the side ribs, and the elongate body nests between two side ribs of the track shoe and extends over the intermediate rib.

13. The combination as claimed in claim 10, wherein the elongate body extends across the transverse length of the track shoe, from one end of the track shoe to the other end of the track shoe.

14. The combination as claimed claim 10, wherein the device is releasably secured to the continuous track.

15. A combination of a continuous track with at least one device as claimed in claim 1 secured to the track.

16. The device as claimed in claim 1, wherein the angle between the line of the first ground engaging feature and the line of the second ground engaging feature is at approximately 30 degrees, 40 degrees, 50 degrees, 60 degrees, 70 degrees, 80 degrees or 90 degrees.

17. The device as claimed in claim 1, wherein the plurality of teeth of the first ground engaging feature comprise at least four teeth each terminating at an end point, the end points of the at least four teeth of the first ground engaging feature being disposed in a curved line when the first ground engaging feature is viewed from a side thereof.

18. The device as claimed in claim 17, wherein the plurality of teeth of the second ground engaging feature comprise at least four teeth each terminating at an end point, the end points of the at least four teeth of the second ground engaging feature being disposed in a straight line when the second ground engaging feature is viewed from a side thereof.

* * * * *